Dec. 29, 1959 L. D. ARMSTRONG 2,918,719

SEMI-CONDUCTOR DEVICES AND METHODS OF MAKING THEM

Filed Dec. 30, 1953

INVENTOR.
LORNE D. ARMSTRONG
BY J. L. Whittaker
ATTORNEY 2,918,719
Patented Dec. 29, 1959

2,918,719

SEMI-CONDUCTOR DEVICES AND METHODS OF MAKING THEM

Lorne D. Armstrong, Princeton, N.J., assignor to Radio Corporation of America, a corporation of Delaware Application December 30, 1953, Serial No. 401,240

3 Claims. (Cl. 29—25.3)

This invention relates to semi-conductor devices and more particularly to methods of attaching electrical leads to electrodes of alloy junction type semi-conductor devices.

Alloy junction and other large area electrode semi-conductor devices are well known. A typical alloy junction device comprises a body of semi-conductive material having at least one junction-forming electrode alloyed or fused to its surface. To render these devices useful in electrical circuits it is customary to attach leads to the electrodes. Attaching leads has in certain instances been a relatively difficult matter. For example, in one form of transistor particularly useful for high frequency applications, an electrode is located at the bottom of a narrow depression, or well, in one side of a semi-conductor body. Since, for reasons explained in greater detail hereinafter, it is generally not advisable to attempt to solder a wire end-on to such an electrode it has been the practice to bend a wire lead in the form of a double offset so that a longitudinal portion near one end of the wire may be brought into contact with the electrode at the bottom of the well. In a typical device the well may measure less than about .01" in diameter. It may be readily seen, therefore, that attaching leads to such electrodes without simultaneously contacting the walls of the well presents a formidable problem.

One feature of the instant invention relates to attaching leads to alloy junction device electrodes. Another feature concerns a method of simultaneously forming an electrode and attaching a lead to it.

Partly because of difficulties encountered in connecting a wire lead to an electrode which may be as small as .005" in diameter it has previously been suggested simultaneously to alloy an electrode to a semi-conductor body and to fuse a lead to the electrode. This simultaneous process has proven difficult and when attempted on a large scale the proportion of satisfactory to unsatisfactory units produced sometimes has been low. It is believed that a large part of the difficulty lies in a tendency of an untreated wire lead to penetrate through the molten electrode material during the alloy process and adversely to affect the p–n junction. In addition, the material of the electrode tends to creep along the surface of the wire away from its desired location because of the wetting action of the material on the wire. If, however, the wire is selected of a material such that the electrode material does not wet it, satisfactory contact cannot be effected.

Accordingly, one object of the instant invention is to provide improved methods of attaching leads to large area electrodes of semi-conductor devices.

Another object is to provide improved methods of forming an alloy junction electrode and simultaneously attaching a lead thereto.

Another object is to provide an improved electrical lead wire suitable for making connections to large area electrodes of semi-conductor devices.

These and other objects may be accomplished by the practice of the instant invention which provides an electrical lead comprising a wire having its contact end shaped into the form of a small sphere. Difficulties previously encountered in making connections to electrodes are obviated by the use of such a lead. Due to its rounded shape, the end of the lead may be pressed lightly upon and even allowed to penetrate through a molten electrode without adversely affecting the electrical characteristics of the device to which the electrode is attached. Also, when the electrode material wets the wire, the rounded shape of the tip minimizes the tendency of the electrode material to creep along the wire.

The invention will be described in greater detail in connection with the accompanying drawing of which:

Similar reference characters are applied to similar elements throughout the drawing.

Figure 1:
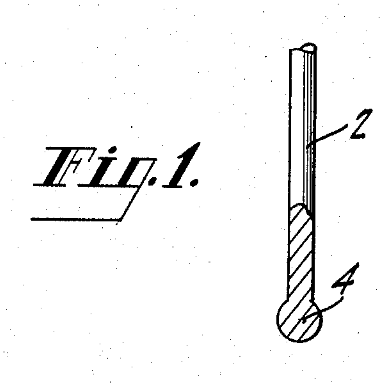
Figure 1 is a partial, cross-sectional, elevational view of a lead according to the instant invention.
Figure 2:
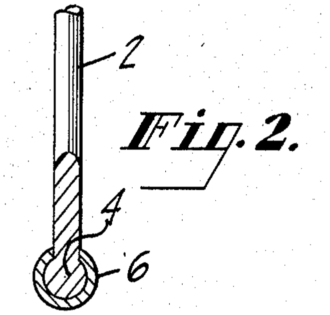
Figures 2, 3 and 4 are partial, cross-sectional, elevational views illustrating three successive steps in the making of a device according to the invention.
Figure 3:
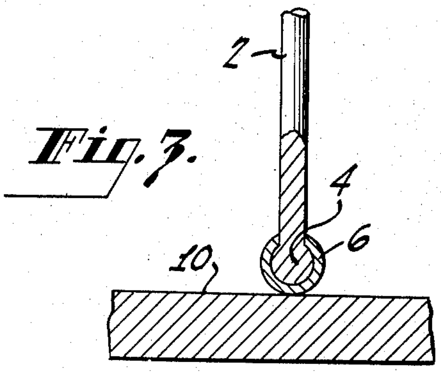
Figure 4:
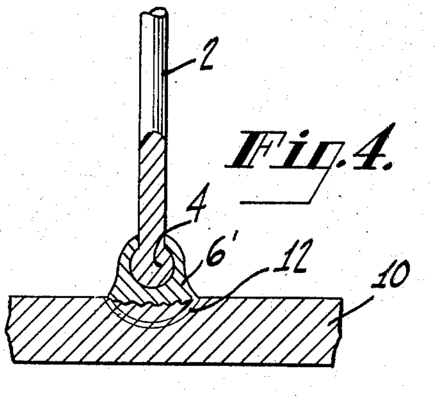

An alloy junction type semi-conductor device may be made according to one embodiment of the invention as shown in Figures 1 through 4. There is first prepared an electrical lead 2 which may be of nickel and which has a rounded tip 4. The lead may conventiently be about .005" in diameter and the rounded tip may be formed by any convenient means such as, for example, the spark gap method described in U.S. Patent No. 2,050,416. According to this method a cut wire is held perpendicularly to and in contact with a metal or carbon plate. An electric current is passed through the wire into the plate. While the current is flowing, the wire is withdrawn from the plate so as to form an electric arc between the wire and the plate. The arc melts a small portion of the wire which is constricted by surface tension forces into a spherical shape.

For the purposes of the instant invention, however, it is preferred to form a ball tip at the end of a lead wire by a slightly different method which may be more uniformly controlled. The cut lead is included in an open circuit connected to a condenser charged to about 200 volts. The size of the condenser is not critical and may be from about 20 $\mu$fd. up to 100 $\mu$fd. or more. One side of the condenser is connected to the wire lead and the other side to a carbon or metal ground plate. The end of the lead is brought close to the metal plate to strike an arc which discharges the condenser and forms a ball tip on the wire.

When using a .005" diameter nickel wire, a 90 $\mu$fd. condenser charged to about 200 volts will produce a ball tip about .008" in diameter. Wires of other materials or of different diameters may be treated with different quantities of electrical charge depending upon the amount of heat required to melt their tips and the size of the ball desired. Wires of greater diameter or of a more refractory material than the .005" nickel wire described herein may be formed by utilizing either a larger condenser or a greater charging voltage or both.

The material of the wire lead is not generally critical in the practice of the invention. For reasons obvious to those skilled in the art, however, it is desirable to utilize a wire having a relatively high melting point, relatively high strength and reasonably good flexibility. The wire should also be substantially insoluble in the electrode material to be used and should not yield impurities which significantly affect the conductivity of the semi-conductor body of the device being formed. Since nickel wire possesses all these properties and is commonly used to form electrical leads to semi-conductor devices, the following illustrative example describes a process utilizing a wire of nickel.

The tip 4 of the nickel lead is dipped in a flux such as a tin chloride solution and is then coated with a relatively thick layer 6 of an electrode material such as an indium. The coating may be conveniently applied by dipping the rounded tip of the wire into a molten bath of the electrode material. The thickness of the coating may be controlled by varying the temperature of the bath. For example, a coating about .002" thick may be readily provided by dipping the lead into a bath of indium maintained a few degrees above its melting point.

The coated ball tip of the wire is placed in contact with a wafer 10 of semi-conductive material such as n-type germanium. The wafer may be of any convenient size such as about 1/16" square end .005" thick. The wafer and the wire are heated in contact in a non-oxidizing atmosphere at about 500° C. for about five minutes to produce the device shown in Figure 4. The time and temperature of heating are not critical in the practice of the invention but may be varied within the general limits ordinarily found operable in making alloy junction devices. During the heating the electrode material melts and alloys into the surface of the semi-conductor wafer to form a p–n rectifying junction 12. Due to the shape of the wire lead the electrode material remains agglomerated in the region of contact with the wafer and does not creep along the wire lead in substantial amounts. When cooled, the device may be conventionally mounted and utilized as a diode rectifier in a circuit.

It will be recognized, of course, that other devices such as transistor triodes may be produced by attaching more than one electrode to a semi-conductor body according to the invention. The previously necessary steps of attaching leads to separately formed electrodes is eliminated and the rectifying junctions once formed need not be further disturbed by heating. In the case of a triode, of course, it is also desirable to make a non-rectifying contact to the semi-conductive wafer for use as a base lead.

Although in the example heretofore described indium is alloyed to an n-type germanium wafer, the practice of the invention is equally applicable to the use of other materials. For example, the semi-conductive material need not be germanium but may be silicon, or aluminum antimonide. If the semi-conductive material is n-type, any of the so-called p-type impurity materials may be utilized as an electrode material in place of indium. The semiconductive material may be of p-type conductivity, however, in which case any of the n-type impurity materials may be utilized in place of indium. In the cases of germanium and silicon alternate p-type impurity materials include aluminum, gallium and thallium, and n-type impurity materials include the elements of the nitrogen group of the periodic table. When utilizing the nitrogen group elements as electrode materials, however, it is generally preferred to alloy them with relatively large proportions of a relatively soft, inert metal such as lead. Thus, one electrode material generally suitable for use with p-type semi-conductive germanium or silicon comprises an alloy of about 90% lead and 10% antimony, bismuth or arsenic.

By an "impurity material" is meant a material which when dispersed in a semi-conductive material provides conductivity type-determining electric charge carriers. It is presently believed that such charge carriers are provided by ionization of at least a portion of the dispersed atoms of an impurity-yielding material. The ionization may provide electrons, in which case the inpurity material is said to be n-type, or it may provide electron-deficiency centers, or holes, in which case the impurity material is said to be p-type.

Figures 5, 6:
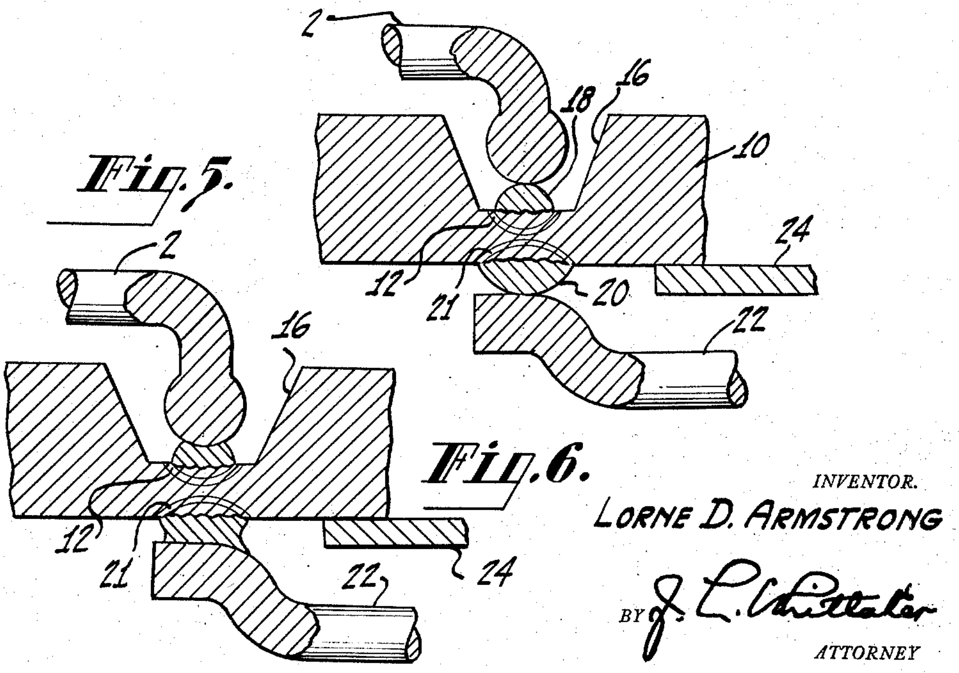
Figures 5 and 6 are partial, cross-sectional, elevational views of a high frequency semi-conductor device illustrating successive steps in connecting electrical leads to the electrodes thereof according to the instant invention.

Figures 5 and 6 illustrate a method of attaching leads according to the invention to electrodes of a typical high frequency transistor device. While the electrodes of such a device may be formed by the process heretofore described, it is presently preferred to form the electrodes independently and to attach the leads in a subsequent operation. With presently available equipment this method allows a greater degree of control in forming the electrodes and also permits a relatively more accurate centering of the electrode at the bottom of the well.

A semi-conductor device comprising a base 10 of semi-conductive germanium having a well 16 in one side thereof and an electrode 18 fused to the floor of the well may be produced by the method described in the copending application of J. I. Pankove, Serial No. 293,330 filed June 13, 1952. The device described by Pankove comprises two closely spaced p–n rectifying junctions 12 and 21 and may be operated as a high frequency triode. The principal purpose of the well is to provide a relatively close spacing between the two p–n rectifying junctions without sacrificing the physical strength of a relatively thick base wafer.

After the unit is formed, leads 2, 22 and 24 may be attached to the electrodes and to the semi-conductor body respectively. According to the invention the lead 2 attached to the electrode situated in the well is provided with a ball tip 4. The lead 22 connected to the second electrode 20 may be attached according to previous practice. The lead 24 which is attached to the semi-conductor body by a non-rectifying solder connection serves as a base lead. The two electrode leads are coated with a solder to facilitate attaching them to the electrodes without melting the electrodes. A suitable solder is one known in the trade as "Cerrobend" which comprise by weight about 50% bismuth, 26.7% lead, 13.3% tin and 10% cadmium. The base lead may be prepared by coating it with any known low melting point solder capable of wetting the base lead and of forming a non-rectifying connection to germanium. A typical solder which has been found satisfactory to make a non-rectifying connection to germanium comprises about 50% tin and 50% lead by weight. The three leads may be welded to a support and the prepared device may be supported between the two electrode leads by a light spring pressure provided by the leads themselves. The ensemble is heated for about thirty seconds at about 110° C. to melt the solder and to fuse the leads to the device. The completed device with the leads attached is shown in Figure 6.

As may be readily seen from the drawing, the use of a ball tip lead substantially simplifies making a connection to an electrode in the well of a high frequency device. According to previous practice a wire lead shaped with a double offset, similar to the lead 22 shown in the drawing connected to the flat surface electrode 20, is used to make a connection to the electrode within the well. Such a lead is relatively difficult to place accurately in contact with a depressed electrode and tends to slide off the electrode and to make contact directly with the semi-conductor body along he walls of the well.

It will be apparent from the foregoing description that the practice of the invention is applicable to attaching leads to other devices than those specifically described. For example, leads according to the invention may be utilized to make connections to electroplated or soldered electrodes of so-called surface barrier devices. Broadly, the invention is applicable to all semi-conductor devices having large area electrodes, as distinguished from point contact devices.

There have thus been described improved leads for making electrical connections to semi-conductor devices and improved methods of making such devices.

What is claimed is:

1. A method of making an electrical device comprising forming a ball-tip upon an end of a wire lead, coating said tip with an impurity-yielding material capable of imparting one conductivity type to a semi-conductive material when dispersed therein, and heating said tip in contact with a semi-conductor body of an opposite conductivity type thereby to alloy said impurity-yielding material into the surface of said body and to form a rectifying junction in said body.

2. The method according to claim 1 in which said impurity-yielding material is indium and said semi-conductor body is of n-type germanium.

3. In a method of fabricating a semiconductor device of the type comprising a body of semiconductor material having a metallic rectifying electrode fused to a surface thereof, the steps comprising providing a lead wire with a ball shaped tip, coating said tip with a low-melting solder, contacting said coated tip to a surface of said electrode, and heating the assembly to a temperature high enough to melt said solder and fuse it with said electrode.

References Cited in the file of this patent

UNITED STATES PATENTS

| | | |
|---|---|---|
| 2,561,411 | Pfann | July 24, 1951 |
| 2,654,059 | Shockley | Sept. 29, 1953 |
| 2,671,156 | Douglas et al. | Mar. 2, 1954 |
| 2,721,965 | Hall | Oct. 25, 1955 |
| 2,725,315 | Fuller | Nov. 29, 1955 |
| 2,753,497 | Jenkins et al. | July 3, 1956 |
| 2,764,642 | Shockley | Sept. 25, 1956 |
| 2,792,538 | Pfann | May 14, 1957 |
| 2,837,618 | Gildart | June 3, 1958 |
| 2,842,724 | Thedieck | July 8, 1958 |

UNITED STATES PATENT OFFICE

Certificate of Correction

December 29, 1959

Patent No. 2,918,719

Lorne D. Armstrong

It is hereby certified that error appears in the printed specification of the above numbered patent requiring correction and that the said Letters Patent should read as corrected below.

Column 2, line 48, for "100 $\mu$fd." read —1000 $\mu$fd.—.

Signed and sealed this 14th day of June 1960.

[SEAL]

Attest:
KARL H. AXLINE,
*Attesting Officer.*

ROBERT C. WATSON,
*Commissioner of Patents.*